W. LA HODNY.
ADJUSTABLE BRACKET FOR MIRRORS AND OTHER OBJECTS.
APPLICATION FILED AUG. 27, 1917.
1,328,677.
Patented Jan. 20, 1920.
2 SHEETS—SHEET 1.
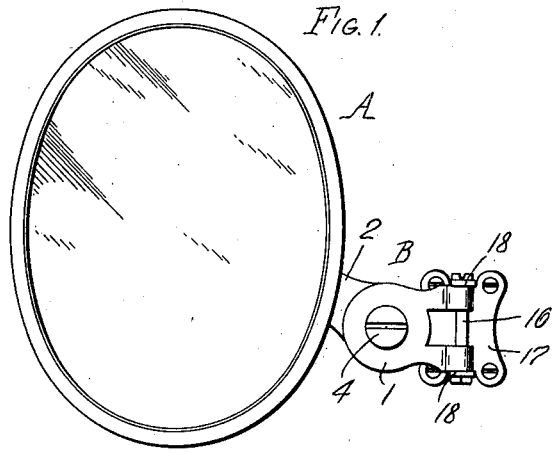
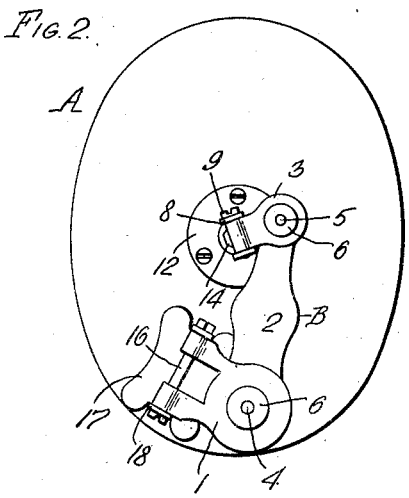
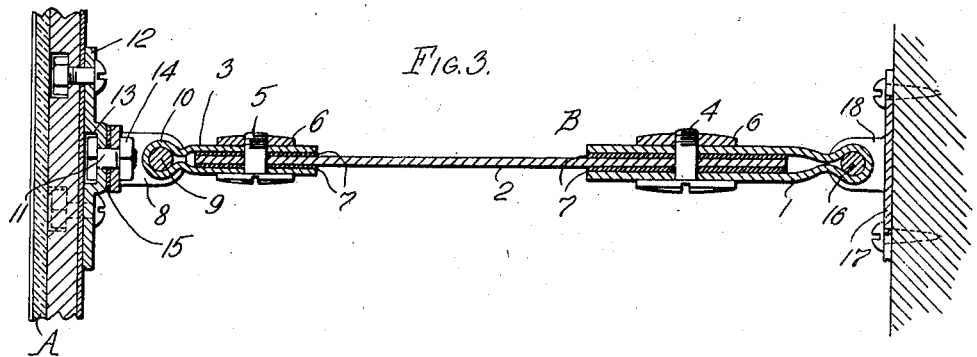
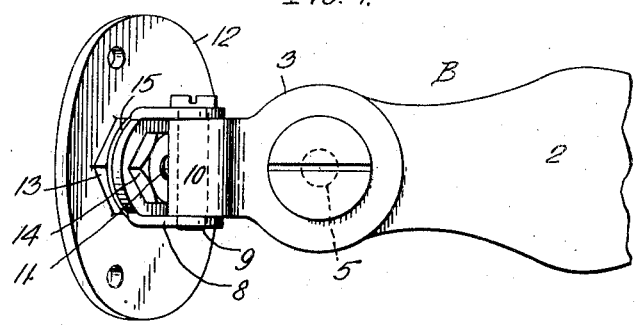
INVENTOR
William La Hodny.
By Wilhelm Parker.
ATTORNEYS.

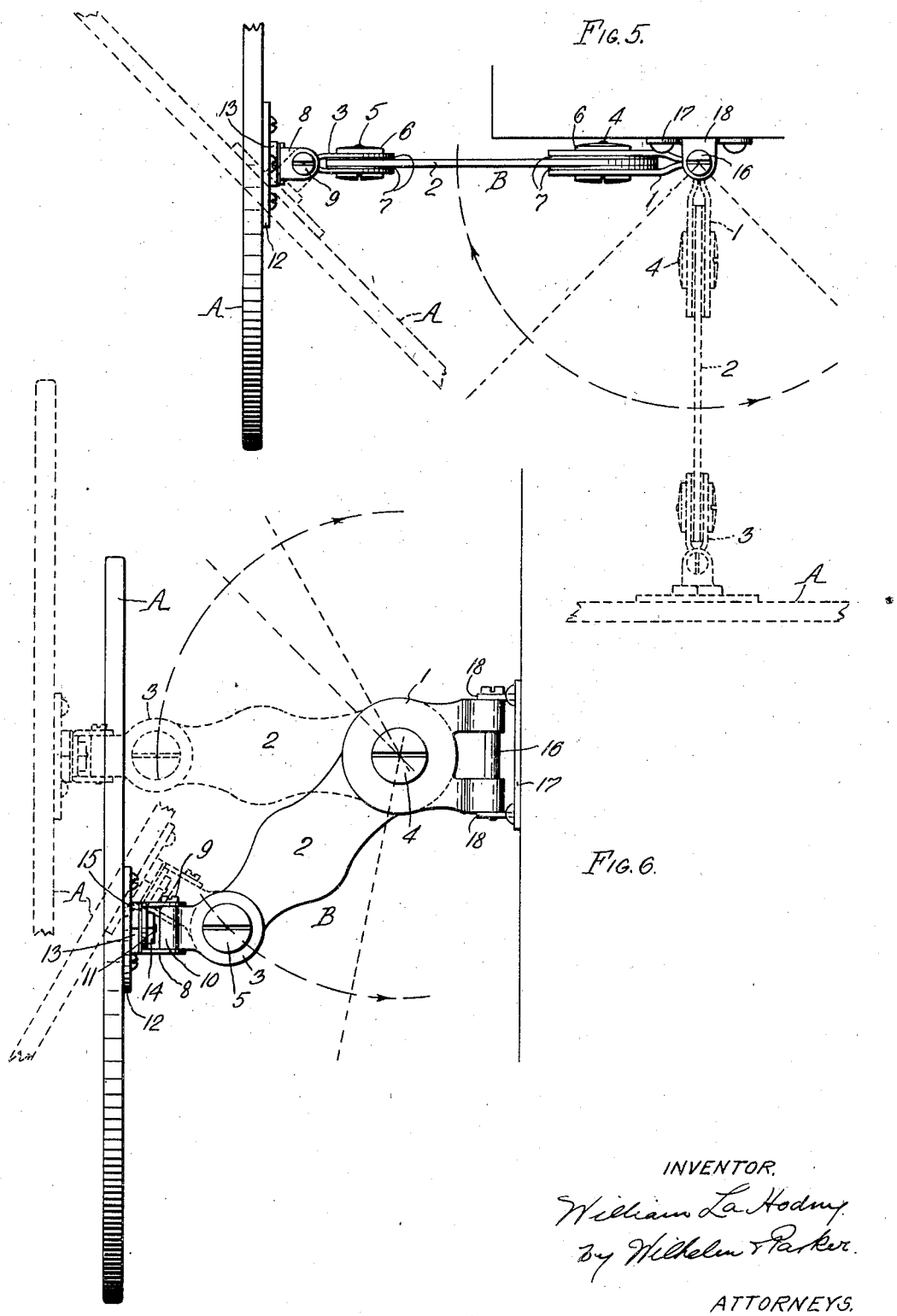

UNITED STATES PATENT OFFICE.

WILLIAM LA HODNY, OF BUFFALO, NEW YORK.

ADJUSTABLE BRACKET FOR MIRRORS AND OTHER OBJECTS.

1,328,677.

Specification of Letters Patent.    Patented Jan. 20, 1920.

Application filed August 27, 1917.   Serial No. 188,275.

*To all whom it may concern:*

Be it known that I, WILLIAM LA HODNY, a citizen of the United States, residing at Buffalo, in the county of Erie and State of New York, have invented a new and useful Improvement in Adjustable Brackets for Mirrors and other Objects, of which the following is a specification.

This invention relates to adjustable supporting brackets for mirrors and analogous objects.

The object of the invention is to provide a desirable adjustable bracket of attractive appearance whereby the mirror or object can be supported at different desired elevations and at any desired horizontal or vertical angle at any of said elevations; also to make the bracket of such construction that the mirror or object supported thereby can be swung out of the way substantially flat against the wall or support on which the bracket is secured, and so that the bracket although affording a considerable range of adjustment for the mirror or object is nevertheless adapted to be folded into compact form against the mirror or object so as to project only a very short distance from the back of the mirror or object, and so as not to extend beyond the edge of the same, thereby enabling the mirror or object to be packed in a container of the minimum size.

In the accompanying drawings:

Figure 1 is a front elevation of a mirror provided with a bracket embodying the invention.

Fig. 2 is a rear elevation thereof, showing the bracket folded compactly against the back of the mirror.

Fig. 3 is an enlarged sectional plan view of the bracket.

Fig. 4 is a side elevation of the outer end of the bracket.

Fig. 5 is a plan view, showing by full and broken lines different adjustments of the bracket and mirror.

Fig. 6 is a side elevation thereof, also showing different adjustments.

A represents a mirror or other object, and B represents a jointed adjustable bracket attached to the mirror or object A and adapted to be mounted or secured on a wall or other support for supporting the mirror or article A in different desired positions of adjustment.

The bracket comprises preferably three arm sections 1, 2 and 3 which are pivotally connected to swing to different angular relations to each other in the same or parallel planes. The intermediate arm or section 2 consists of a flat metal plate or stamping of sufficient thickness to be practically stiff or rigid. Each of the end sections or arms 1 and 3 consists of a flat metal plate or stamping which is bent upon itself to form parallel jaws which straddle or embrace the adjacent end of the intermediate section. The section 1 is pivotally secured to one end of the intermediate section 2 by a pivot 4 passing through registering holes in the two jaws of the section 1 and in the intermediate section, and the section 3 is similarly pivoted on the opposite end of the intermediate section 2 by a suitable pivot 5. The pivots 4 and 5 preferably consist of flat headed screws which are held in place by flat circular nuts 6 screwed on the threaded ends of the screws and adapted to be tightened for clamping the ends of the intermediate section firmly between the jaws of the outer sections 1 and 3. Circular disks 7 of fiber or other suitable material are preferably interposed between the opposite faces of the intermediate section and the jaws of the outer sections 1 and 3, so that when the nuts or screws 6 are tightened the disks 7 will be compressed between the sections of the bracket arm and afford the necessary friction to securely hold the sections in the angular position to which they may be adjusted. This construction enables the sections of the arm to be so firmly held that considerable force is necessary to swing one section upon another so that the bracket will support a mirror or object of considerable weight stationarily and firmly in any position of adjustment of the bracket sections.

Preferably the heads of the pivot screws 4 and 5 and the nuts 6 are circular and the ends of the intermediate and end sections of the arm are rounded concentrically with the pivots, while the three sections of the arm are of the gracefully curved shape shown. The intermediate section also preferably tapers or decreases in width toward its outer end and the outer section 3 is smaller than the inner section 1. The bracket as a whole is therefore attractive in appearance and is suitable for an ornamental bracket for mirrors or other articles of furniture in the home.

The outer section 3 of the bracket is connected to the mirror or object A by a universal joint adapting the mirror or object to be swung or turned in different planes about two axes disposed perpendicularly to each other. This joint preferably consists of a U-shaped yoke 8 which is pivoted to the outer section 3 of the bracket by a vertical screw or pivot 9 of any suitable sort passing through holes in the upper and lower ears of the yoke and through a loop 10 formed by the bend in the outer section 3, and which yoke is suitably swiveled by a screw or pivot 11 perpendicular to the pivot 9 to a back plate 12 rigidly secured to the mirror or object A. Preferably the back plate 12 is provided in the side thereof next to the mirror with a polygonal shaped socket or recess 13 in which the correspondingly shaped head of the screw 11 is seated. The screw passes through a central hole in the back plate and a registering hole in the yoke 8 and is held in place by a nut 14 on the outer end of the screw. The screw is held from turning by the engagement of its head in the socket 13 in the back plate 12, so that the swivel joint can be readily tightened by screwing up the nut 14. If desired the screw can be reversed, the nut being located in the seat in the back plate and the screw head arranged to bear against the yoke. In such case the nut is confined and held from turning in the seat in the back plate so that the screw can be readily inserted, and tightened or loosened without displacing the nut. A washer 15 of fiber or other suitable material is preferably interposed between the base of the yoke 8 and back plate 12 so as to produce the necessary friction between the yoke and the back plate to hold the mirror from movement in the position to which it is turned on the swivel joint. The yoke 8 and back plate 12 can be readily stamped from sheet metal into the shape shown.

The section 1 of the bracket is hinged by a suitable pivot or screw 16 to a supporting plate or member 17 which is adapted to be rigidly fastened by screws or otherwise on a wall or other suitable support. The screw 16 extends vertically through the loop formed by the bend in the inner section 1 of the bracket and through holes in ears or lugs 18 projecting outwardly from the supporting plate 17 above and below the inner bracket section 1. The entire bracket is thus adapted to swing horizontally on its hinge connection with the supporting plate 17.

The bracket as a whole with the mirror supported thereby can be swung laterally or horizontally about the vertical pivot 16 connecting the inner end of the bracket to the supporting plate 17 and the mirror or object A can be swung horizontally on the vertical pivot 9 at the outer end of the bracket to a position at any desired angle to the bracket or to either side of the bracket substantially parallel therewith. In addition to these lateral adjustments of the mirror and bracket, the mirror can also be turned on the swivel joint 11 in a plane perpendicular to its plane of movement on the pivot 9, and the sections of the bracket can be swung relatively to each other on their connecting pivots 4 and 5 so as to position the mirror or object at different desired elevations and at different desired inclinations. The mirror or object can thus be supported at different elevations and is adapted to be adjusted substantially universally to any desired position or inclination at any of these elevations. By reason of the flat shape of the parts of the bracket and the described pivotal connections between the same, and between the bracket arm and the mirror and supporting plate 17, the bracket, when detached from the wall can be swung into a position substantially flat against the back of the mirror or object and no part of the bracket will project outwardly beyond the peripheral edge of the mirror or object as shown in Fig. 2. The mirror or object with the bracket attached thereto can therefore be placed in a box or container which is only wide and long enough to receive the mirror and which need be only of slightly greater depth than the thickness of the mirror to accommodate the substantially flat bracket. All of the parts of the bracket except the pivots can readily be stamped from sheet metal.

I claim as my invention:

1. An adjustable supporting bracket comprising inner, outer and intermediate arm sections consisting of relatively thin wide metal plates arranged vertically on edge, transversely horizontal pivots connecting said sections and permitting the sections to be adjusted vertically to different angular relations, a supporting member to which said inner section is connected by a vertical pivot to swing laterally, a yoke connected by a vertical pivot to said outer section to swing laterally, and a member adapted to be fixed to an object and swiveled to said yoke by a horizontal pivot perpendicular to said member and to said yoke pivot to permit said object to turn about a horizontal axis and swing to a position close beside said arm sections.

2. An adjustable supporting bracket comprising inner, outer and intermediate arm sections, consisting of relatively thin wide metal plates arranged vertically on edge, said inner and outer sections being bent to form jaws between which the ends of said intermediate section are gripped and pivotally secured to permit the sections to be adjusted in a vertical plane to different angular relations, vertical pivots embraced by the bends of said inner and outer arm sections and having their axes in said vertical plane, and yokes connected by said pivots to the inner and outer ends of the supporting bracket to swing laterally relatively to said supporting bracket, and one of said yokes having a pivot by which an object is swiveled to turn on said yoke.

Witness my hand, this 25 day of August, 1917.

WILLIAM LA HODNY.

Witnesses:
C. W. PARKER,
M. J. PITMAN.